(12) United States Patent
Sexton et al.

(10) Patent No.: US 6,604,182 B1
(45) Date of Patent: *Aug. 5, 2003

(54) METHODS FOR MANAGING MEMORY IN A RUN-TIME ENVIRONMENT INCLUDING ACTIVATION AND DEACTIVATION OF OBJECTS

(75) Inventors: Harlan Sexton, Palo Alto, CA (US); Peter Benson, Boulder, UT (US); Jerry Schwarz, Palo Alto, CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/512,622

(22) Filed: Feb. 25, 2000

Related U.S. Application Data (60) Provisional application No. 60/160,759, filed on Oct. 21, 1999.

(51) Int. Cl.[7] .............................. G06F 12/00; G06F 9/44
(52) U.S. Cl. ..................... 711/170; 707/205; 717/118
(58) Field of Search .......................... 711/170; 707/205; 717/118

(56) References Cited

U.S. PATENT DOCUMENTS 6,161,147 A * 12/2000 Snyder et al. .............. 709/310
6,275,916 B1 * 8/2001 Weldon, Jr. et al. ........ 711/170

OTHER PUBLICATIONS

Oracle 8i/Oracle 8 Java Developer's Guide, Release 8.1.5, Feb. 1999, pp. 1–17.*

* cited by examiner

Primary Examiner—Glenn Gossage
(74) Attorney, Agent, or Firm—Ditthavong & Carson, P.C.

(57) ABSTRACT

Methods for managing memory in a run-time environment are described, in which an object is activated by both initializing the object and registering a routine to deallocate or deactivate the object at the end of a call (e.g. by setting it to null to unreference the object), which prevents the object, which may be a large object, from being migrated into session memory. This deactivation routine is called after the finalization of garbage collected objects that may use the object. In a subsequent call, the object is checked before use to determine if the object is already activated and re-initialized if the object is not activated.

10 Claims, 5 Drawing Sheets

METHODS FOR MANAGING MEMORY IN A RUN-TIME ENVIRONMENT INCLUDING ACTIVATION AND DEACTIVATION OF OBJECTS

RELATED APPLICATIONS

The present application claims the benefit of the following U.S. Provisional Patent Applications, the contents of all of which are incorporated by reference in their entirety:

U.S. Provisional Patent Application Serial No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al.;

U.S. Provisional Patent Application Serial No. 60/185,136 entitled MEMORY MANAGEMENT USING MIGRATION FOR A RUN-TIME ENVIRONMENT, filed on Feb. 25, 2000 by Harlan Sexton et al.;

U.S. Provisional Patent Application Serial No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton.;

U.S. Patent Application Serial No. 60/185,138 entitled STATIC OBJECT SYSTEM AND METHODOLOGY FOR IMPLEMENTING A RUN-TIME ENVIRONMENT, filed on Feb. 25, 2000 by Harlan Sexton et al.;

U.S. Provisional Patent Application Serial No. 60/185,135 entitled AURORA NATIVE COMPILATION, filed on Feb. 25, 2000 by Dmitry Nizhegorodov;

U.S. Patent Application Serial No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al.;

U.S. Provisional Patent Application Serial No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer.

The present application is related to the following commonly-assigned, co-pending U.S. Patent Applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al., now U.S. Pat. No. 6,457,019;

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al., now U.S. Pat. No. 6,499,095;

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.;

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al., now U.S. Pat. No. 6,434,685;

U.S. patent application Ser. No. 09/320,578 entitled METHOD AND ARTICLE FOR ACCESSING SLOTS OF PAGED OBJECTS, filed on May 27, 1999 by Harlan Sexton et al., now U.S. Pat. No. 6,401,185 issued Jun. 4, 2002;

U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al.;

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al.;

U.S. patent application Ser. No. 09/512,621 entitled SYSTEM AND METHODLOGY FOR SUPPORTING A PLATFORM INDEPENDENT OBJECT FORMAT FOR A RUN-TIME ENVIRONMENT, filed on Feb. 25, 2000 by Harlan Sexton et al.; and U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al.

U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al.

FIELD OF THE INVENTION

The present invention relates to computer systems and more particularly to a method for managing memory in a run-time environment.

BACKGROUND OF THE INVENTION

A dynamic run-time environment for a language, such as JAVA™, is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

The state of a program, or "program state," is the set of the objects and the references between the objects that exist at a specific point in time during the execution of the program. A "reference" is used by a run-time environment to identify and ultimately access the region of memory for storing the data of the object. Typically, references between objects in a run-time environment are encoded using machine pointers. A machine pointer is an instance of a native type that contains the address of the object in the main memory, which can be a real memory address or, more commonly, a virtual address on a machine that implements a virtual memory system.

One popular run-time environment is a JAVA™ programming language virtual machine, which supports a platform-independent, object-oriented language developed by Sun Microsystems. In the JAVA™ programming language, the attributes and methods for a class of objects are typically defined in a source file, which is compiled into an architecture-neutral object file containing bytecodes that are interpreted in the virtual machine at the target platform. It is common for objects to reference other objects.

Lately, there has been much interest in using the JAVA™ programming language in a multi-user environment that allows multiple users to connect in separate, concurrent sessions to a server system, such as a relational database system. When designing a run-time environment for such a multi-user environment, scalability in terms of the number of simultaneous users who can establish separate sessions is very important. A significant constraint for user scalability is the size of the memory footprint that each session consumes. For example, a server system may have 100 megabytes (Mb) of memory for supporting all the user sessions. If the session memory footprint is 1 Mb, then only 100 users can be supported at one time. Therefore, it is desirable to reduce the session memory footprint to improve scalability.

One approach for reducing the session memory footprint is to provide a shorter duration memory named "call memory" that is active for the duration of a "call" but automatically deallocated when the call terminates. A call is the period of time when the user is actively using the server, such as during execution of a Structured Query Language (SQL) statement in a database server. Accordingly, those objects that do not need to live beyond the duration of the call are placed in the call memory rather than session memory. When the call is completed, objects in the call memory are deallocated and the call-duration memory is reclaimed for use. This approach has been implemented in Oracle Corporation's PL/SQL language, for instance, in which objects are explicitly declared as having the duration of a call or of a session. Memory management in such a language is straightforward because the objects are simply allocated in the memory that corresponds to their duration.

The JAVA™ programming language, however, defines the lifetime of many objects, especially system objects, to extend throughout the duration of a session and does not have the notion of a call or call duration in the programming model. Therefore, the run-time environment mush have a policy for using call memory. Accordingly, one approach is to simply ignore the provision of the call memory by the multi-user system and allocate every object in session memory, but this approach suffers from scalability because short-lived objects are unnecessarily allocated in session memory.

Another approach is to allocate objects first in the shorter-duration call memory, and then, at the time the call terminates, migrate the objects into the longer duration session memory. In this approach, session memory is consumed only if the object is still alive at the end of the call. The JAVA™ programming language, however, imposes restrictions on this approach by requiring several system classes to store large objects in static class variables. Use of static class variables is also common in user code. In many cases, the state of the these objects is no longer relevant after the call, but they are still considered alive at the end of the call. Therefore, the above-described migration policy causes these large objects to be migrated into session memory even though the state of the large object is no longer relevant, thereby increasing session memoryrequirements per session and reducing scalability.

For example, the standard input, output, and error streams maintain large print buffers that merely reserve space for temporary use by the streams. Typically, when the call terminates the print buffers are flushed so that no meaningful information remains in the buffer. However, the print buffer itself is still a live object, being referenced by its stream class. Therefore, the migration process of copying a stream object at the end of the call to session memory forces the copying of a large, but essentially empty object into session space.

In this example, there is a problem if the user directly attempts to reduce the session memory consumed by these objects by unreferencing the print buffer before the end of the call. Unreferencing an object causes the garbage collector to deallocate the object at the end of the call. If the print buffer was unreferenced, the print buffer would not available for use in the finalization of other garbage collected objects at the end of call. Some objects, for example, will print an error message using a stream in their finalization code, which is called when the objects are garbage collected. In this scenario, at worst, the null print buffer would cause a run-time error or exception, and, at best, the print buffer would be reallocated. In the latter case, the print buffer is still alive at the end of call and is therefore migrated to session memory, thereby defeating the purpose of the user's direct attempt to reduce the session memory usage.

The space used by such objects is substantial, on the order of 150 kilobytes (Kb) for a JAVA™ programming language "Hello World" program, thereby seriously affecting the scalability of the system. Therefore, there is a need for improving the scalability of such run-time environments.

SUMMARY OF THE INVENTION

The related, commonly-assigned, co-pending U.S. patent application Ser. No. 09/512,619 entitled "Method For Managing Memory Using Explicit, Lazy Initialization In A Run-Time Environment" discloses a mechanism for registering a routine to deinitialize the large object in a static class variable at the end of call (e.g. by setting the class variable to null to unreference the large object), which prevents the large object from being migrated into session memory. This routine is called after the finalization of garbage collected objects that may use the large object. In a subsequent call, explicit, lazy initialization is used, in which the large object is checked before use and re-initialized if the large object was still deallocated.

Because the lazy initialization is explicit, all the users of the static class variable have to respect the programming model that the static class variable has to be first checked before its use. While this approach is effective for user code and for the private static class variables of a JAVA™ programming language system class, it is not so suitable for public static class variables of JAVA™ programming language system classes, because users of these public static class variables do not expect these variables to become uninitialized. As a result, large amounts of user code would have to retrofit to explicitly check to determine if the public static class variables need to be re-initialized. Therefore, there is a need for reducing the session memory consumed by such public static class variables without requiring pre-existing user code to be retrofitted.

These and other needs are addressed by the present invention, by providing for activation-based initialization for such public class variables. In an activation-based initialization approach, pointers to objects such as public static class variables are replaced with external references such as those described in the related, commonly-assigned, co-pending U.S. patent application Ser. No. 09/408,847, entitled "A Method and Article for Managing References to External Objects in a Run-Time Environment."

In accordance with this approach, an external reference to an object encodes an index that is used to find corresponding entries in a value array and a descriptor array. The corresponding entry in the value array is null the first time the object is accessed through the external reference. The corresponding entry in the descriptor array provides instructions and arguments for realizing the object, for example, by allocating and initializing memory or by finding a globally shared object as appropriate. The descriptor is evaluated when the corresponding entry in the value array is null and returns a pointer to the realized object. Furthermore, the instructions that realize the object also register an end-of-call routine to deactivate the object at the end of the call, for example, by setting the corresponding entry in the value array to null. This action unreferences the allocated space for the object, thereby preventing its migration into session memory.

One embodiment of the invention is a method and software for managing memory in a run-time environment, in which an object is activated by initializing the object and registering a routine to deactivate the object at an end of a call. At the end of the call, the routine to deactivate the object is executed, preferably after finalization of non-live object during garbage collection. As a result, the object is not migrated into session memory.

Another embodiment pertains to a method and software for managing memory in a run-time environment. A object is accessed by means of an external reference by: extracting an index from the external reference, fetching a pointer value from an entry in a value array at a position indicated by the index, and if the pointer value is a null value, then fetching a descriptor from an entry in a descriptor array at a position indicated by the index, initializing the object based on the descriptor, and registering a routine to deactivate the object at an end of call. At the end of the call, the routine to deactivate the object is executed, for instance, by setting the entry in the value array at the position indicated by the index to null.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for memory management in a run-time environment are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
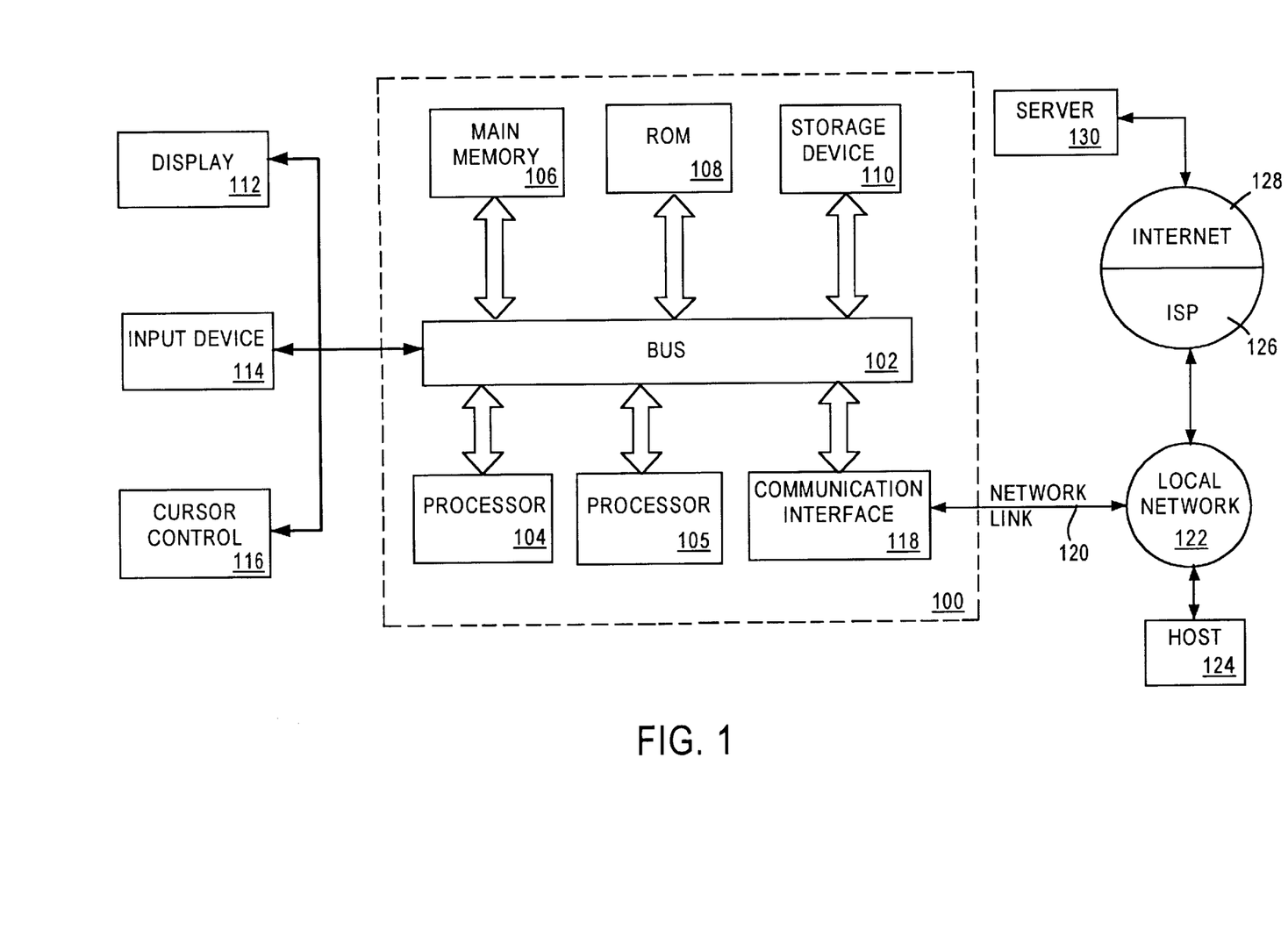
FIG. 1 depicts a computer system that can be used to implement an embodiment of the present invention.

FIG. 1 is a block diagram that illustrates a computer system 100 in which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution.

Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a Compact-Disk Read-Only-Memory (CD-ROM), Digital Video Disk (DVD), any other optical medium, punch cards, paper tape, any other physical medium with patterns of holes, a Random-Access Memory (RAM), a Programmable Read-Only-Memory (PROM), and Electrically Programmable Read-Only-Memory, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Memory Model

Figure 2:
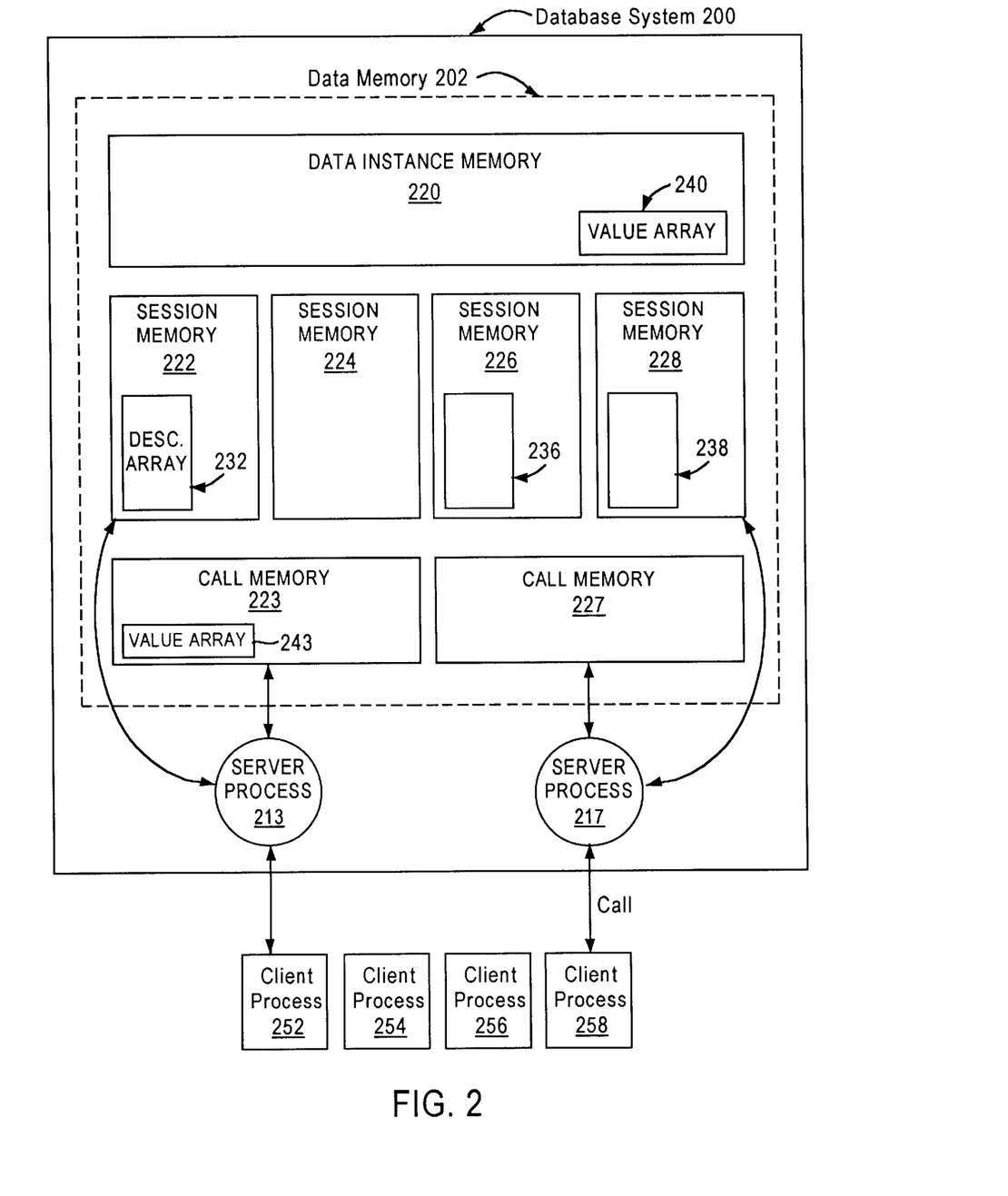
FIG. 2 is a schematic drawing of database server memory model for use with an embodiment of the present invention.

FIG. 2 schematically illustrates a multi-user database system 200 with which a run-time environment for a language such as the JAVA™ programming language may be used, although the present invention is not limited to multi-user database systems in particular and may be applied to other multi-user systems. In the illustrated configuration, client processes 252, 254, 256, and 258 establish database sessions with the database system 200. A database session refers to the establishment of a connection between a client and a database system through which a series calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a JAVA™ programming language object or class, defined for performing a database task for database system 200.

Database system 200 comprises, among other components, a database memory 202 for storing information useful for processing calls and a number of server processes 213 and 217 for handling individual calls. The database memory 202 includes various memory areas used to store data used by server processes 213 and 217. These memory areas include a database instance memory 220, session memories 222, 224, 226, and 228, and call memories 223 and 227. It is to be understood that the number of session memories and call memories in FIG. 2 is merely illustrative and, in fact, the number of such memories will vary over time as various clients make various calls to the database system 200.

The database instance memory 220 is a shared memory area for storing data that is shared concurrently by more than one process. For example, shared memory area may be used store the read-only data and instructions (e.g. bytecodes of JAVA™ programming language classes) that are executed by the server processes 213 and 217. The database instance memory 220 is typically allocated and initialized at boot time of the database system 200, before clients connect to the database system 200.

When a database session is created, an area of the database memory 202 is allocated to store information for the database session. As illustrated in FIG. 2, session memories 222, 224, 226, and 228 have been allocated for clients 252, 254, 256, and 258, respectively, for each of which a separate database session has been created. Session memories 222, 224, 226, and 228 are regions of shared memory used to store static data, i.e., data associated with a user that is preserved for the duration of a series of calls, especially between calls issued by a client during a single database session. JAVA™ programming language static class variables are one example of such static data.

A call memory, such as call memory 227, is used to store data that is bounded by the lifetime of a call. When client 258 submits a call to the database system 200, one of server processes 213 or 217 is assigned to process the call. For the duration of the call, the server process is allocated a call memory for storing data and other information for use in processing the call. For example, server process 217 uses call memory 227 and session memory 228 for processing a call submitted by client process 258.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handle its various calls. The number of calls requiring execution by a server process is typically much fewer than the current number of active clients. Thus, database system 200 is typically configured to execute fewer server processes than the maximum number of active clients.

Activation-based Initialization

In accordance with one aspect of the invention, activation-based initialization is to defer the actual initialization of specified objects until immediately before their use. Since these objects are only initialized when needed, these objects can be deactivated by zeroing or otherwise setting the object to deactivated state when no longer needed, such as at the end of the call, thereby preventing their needless migration to session memory.

In one embodiment, the activation-based initialization is implicit, in that the memory management system is capable of automatically determining that a reference to an object is a run-time external reference, and, if the reference is a run-time external reference, activating the object. Furthermore, to provide the proper timing of deactivating the object at the end of the call, a callback routine is registered at activation time with the memory manager to deactivate the object. This callback routine is invoked by the memory manager during the end of call processing.

Figure 3:
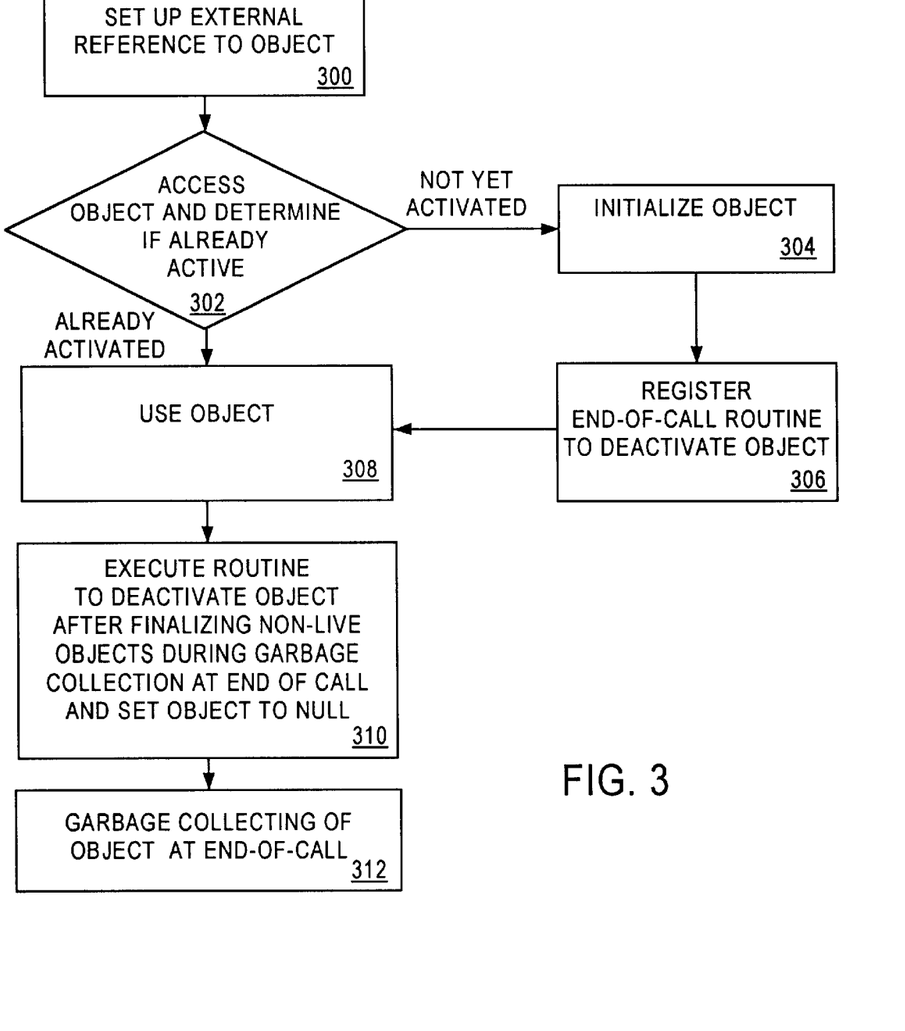
FIG. 3 is a flow diagram of managing memory for an object using explicit, lazy initialization in accordance with one embodiment of the present invention.

FIG. 3 is a flow diagram illustrating the operation of managing memory using activation-based initialization in accordance with one embodiment. In general, this activation-based initialization technique is suitable when the points of potential use of the object is dispersed in many places in the code, for example, in the case of using a public print buffer of a stream. Therefore, for purposes of explanation, the operation illustrated in FIG. 3 is explained using the print buffer as an example, although it is to be understood that the present invention is not limited to this particular example.

Referring to FIG. 3, at step 300, an external reference to an object such as a public static class variable is set up, as described in greater detail hereinafter. At step 302, the object is accessed by way of the external reference during the course of execution and it is determined whether the object is already activated. If the object is already activated, then execution branches to step 308. On the other hand, if the object is not yet activated, then the object is activated. The object is initialized in step 304, for example, by allocating or finding memory for the object. Preferably, at this point, an end-of-call routine is also registered in step 306 with the memory manager to arrange for the object to be deactivated at the end of the call, which prevents the object from being migrated into session memory. After activation or if the object is already activated, execution proceeds to step 308 and the object is used. For example, if the object is a print buffer, then the print buffer may be filled with characters. As described in greater detail herein after, a cached pointer value for the initialized object is fetched for use by the executing process.

Step 310 is performed at the end of a call, before migration. In particular, the memory manager steps through the end-of-call registry and invokes the registered end-of-call routines. When the end-of-call routines are invoked, instructions are executed to deactivate the object so that the object does not have any memory to be migrated to session memory. Typically, the deactivation is performed by finalizing the object and setting the cached pointer value for the initialized object to null, which unreferences the memory previously allocated for the object and allows that memory to be reclaimed by the garbage collector (step 312).

Run-time External References

When a class is loaded, a run-time external reference to a desired public static class variable, for example, is generated and stored in a slot of the class. A run-time external reference is a reference to an external object, such that dereferencing the run-time external reference causes the external object to be loaded into virtual memory, if the external object is not currently loaded.

In one embodiment, the run-time external reference is generated based on a "stub object." The stub object includes a "descriptor," which is a group of data that identifies the external object and is sufficient to create or recreate the external object. Typically, the descriptor is a string that names the object or includes directions for loading and initializing the external object, for example, from an identified file in secondary storage. Furthermore, the stub object is associated with a "realize routine," which can be a static member function or a generic function for the stub object's class. The realize routine is responsible for creating or recreating the external object using the information encoded in the descriptor. The implementation of the realize routine and descriptor is dependent on the particular external object and generally is written specifically for that external object or for external objects belonging to a particular class.

In one embodiment, the corresponding entry in the descriptor array may be a thunk that provides instructions and arguments for realizing the object, for example, by allocating and initializing memory or by finding a globally shared object as appropriate. The thunk in the descriptor is evaluated when the corresponding entry in the value array is null and returns a pointer to the realized object.

In one embodiment, the stub object is marked "activatable", for example by setting an appropriate bit in the object header, to distinguish the stub object from other objects whose loading into session memory is not to be deferred. Thus, an activatable, stub object is a proxy for another object that will be recreated upon demand using information stored in the activatable, stub object.

Figure 4:
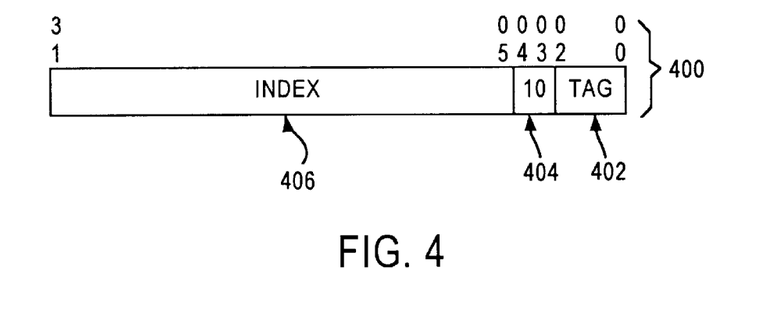
FIG. 4 is a schematic drawing of a layout of an external reference in accordance with an embodiment of the present invention.

FIG. 4 illustrates the layout of a run-time external reference 400 according to one embodiment. In order for run-time external references to coexist with other types of references, such as machine pointers and numeric references to loaded objects, a run-time external reference preferably includes a tag 402 that indicates that the reference is a run-time external reference. In this embodiment, non-external references are also tagged, but with a different value to distinguish themselves from run-time external references and to indicate other storage properties of the objects they reference. In other embodiments that do not employ reference tagging, this information can be stored in the header or body of the object, for example by deriving all external objects from a base class for activatable objects.

In one implementation of reference tagging, a certain number of bits in a reference, for example the higher-order bits or lower-order bits, are reserved for distinguishing the run-time external references from other references. The information embedded within the reference, which is likely to be sitting in a fast-access machine register, can therefore be retrieved very quickly, without requiring additional memory cycles to fetch the header of the referenced object.

A preferred implementation of reference tagging introduces an alignment invariant and then exploits the alignment invariant in a run-time environment to encode the run-time external reference format in the lower-order bits. Specifically, objects managed by the run-time environment are stored at an N-bit aligned address, or, in other words, the storage for these objects begins at virtual addresses at $2^N$-byte boundaries. For example, if the objects can be stored at three-bit aligned addresses, that is, on $2^3$=8 byte boundaries, a legal start address for such an object might be 0x20446740, but an address such as 0x20446743 is not a valid start address for the storage of an object.

Consequently, the three least significant bits of the reference do not serve to differentiate different objects, since only one of the eight values for the three least significant bits is a legal address and the remaining seven values do not point to any other object. Given this alignment restriction, references that resolve to addresses 0x20446740 through 0x20446747 effectively refer to the same object. Therefore, any of the N least significant bits of a reference to an N-bit aligned object can be used as a tag to encode other information, for example, whether the referenced object may be an external object to be loaded upon use.

A three-bit tag in a thirty-bit reference, will theoretically allow for $2^{32-3}=2^{29}$, or about half a billion, different run-time external references. Since this number of run-time external references is well in excess of what is needed in most, if not all, run-time environments and since the number of different three-bit tag values is limited (i.e. to eight), the same three-bit tag value for run-time external references is preferably shared with other kinds of references. In one embodiment, the tag value used by run-time external references is shared with indexed references, where an indexed reference is a type of reference that evaluates to an array entry of one sort or another.

Accordingly, some of the non-tag bits of an indexed reference specify the array and other bits specify an index into the array. In the case of a run-time external reference 400 in FIG. 4, array bits 404 specifies the arrays that are used to implement run-time external references, namely a descriptor array and a value array. The remaining, index bits 406 specify the common index into the descriptor array and the value array. In one embodiment, the descriptor array is allocated in session memory, e.g. as descriptor arrays 232, 236, and 238 in sessions memories 222, 226, and 228, respectively, while the value array can be allocated in non-session memory, for example, value array 243 in call memory 223 or value array 240 in database instance memory 220.

Creating Run-time External References

Figure 5:
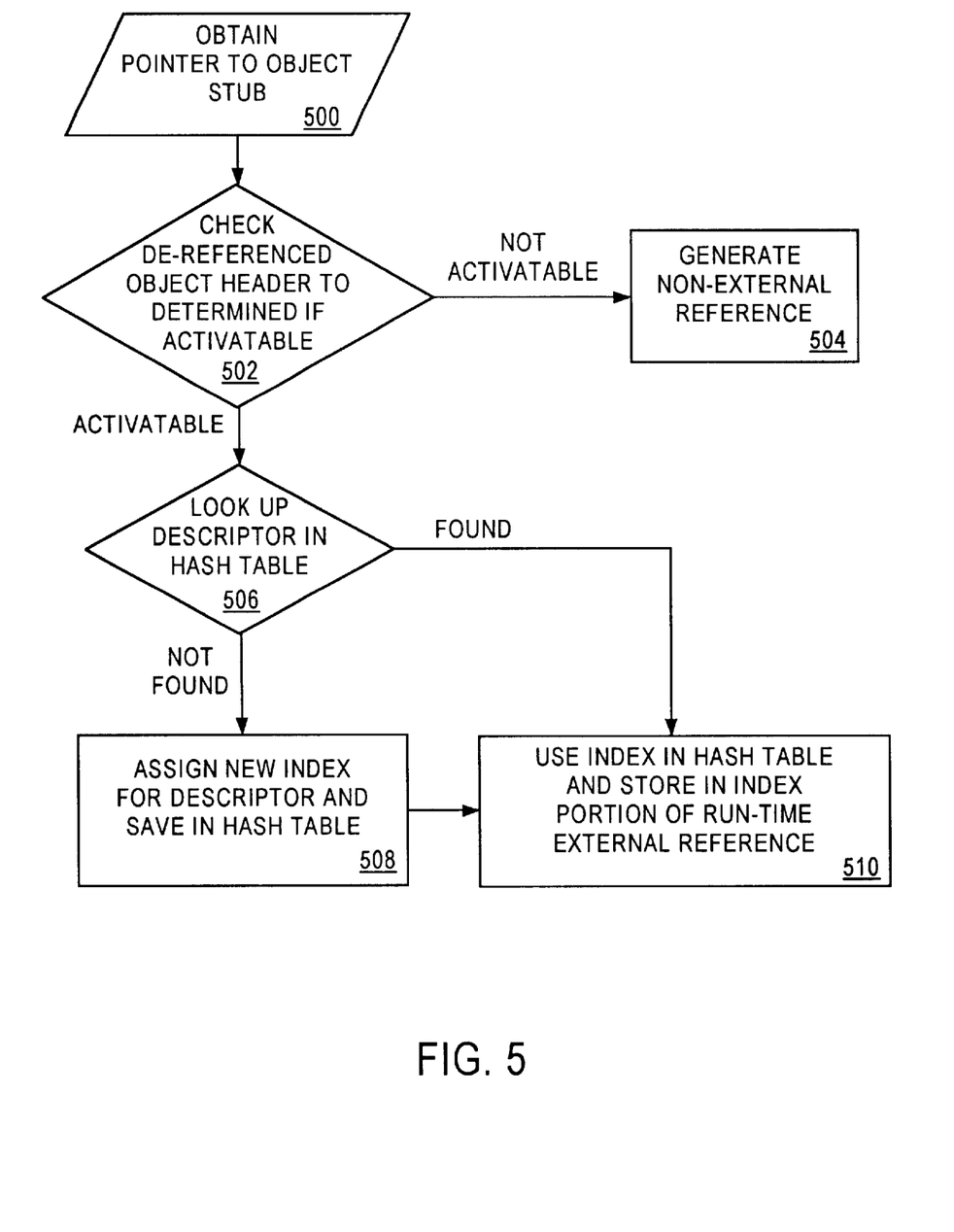
FIG. 5 is a flowchart for generating an external reference from a pointer to a stub object in an embodiment of the present invention.

FIG. 5 is a flowchart illustrating steps taken in creating a run-time external reference for an external object based on a pointer to a stub object for the external object in accordance with an embodiment. At a step 500, a pointer to the stub object is obtained for assignment in a slot of an object within the run-time environment. During the assignment procedure in step 502, the pointer is dereferenced at a zero or negative offset to check a bit in the header of the dereferenced object for determining whether the dereferenced object is "activatable." An activatable object is an object that can be allocated and initialized upon dereference.

If the object is not activatable, then the non-external reference is generated as appropriate for the run-time environment (step 504). For example, if the run-time environment uses tagged machine pointers to reference objects, then an appropriate tagged machine pointer is generated. As another example, if the run-time environment uses tagged numeric references to reference objects in session memory, then an appropriate numeric reference is generated. This reference is stored in the slot of the object.

If, on the other hand, the object is activatable, the referenced object is a stub object and therefore contains a descriptor for activating the object or, in some embodiments, a pointer to the descriptor. Since multiple external references may be generated for the same external object, the descriptor, which uniquely identifies the external object, is looked up in a data structure, such as a hash table to determine whether the external object was already referenced (step 506). If the descriptor is not found in the hash table, then a new index is assigned for the descriptor (and therefore for the external object) and stored in the hash table (step 508). On the other hand, if the descriptor is found in the hash table, the previously assigned index for the descriptor (and therefore the external object) is obtained from the hash table. At step 510, the obtained index value, whether newly assigned or fetched from the hash table, is stored in the index portion 406 of the run-time external reference 400.

After the run-time external reference has been generated during an assignment operation, the run-time external reference is stored in the slot of an object, just like any other reference in the run-time environment is stored in the slot.

Creating and Recreating External Objects

Referring again to FIG. 3, a run-time external reference is dormant from step 300 until the run-time external reference is dereferenced to access an object at step 302 during operation of the run-time environment. Dereferencing a run-time external reference refers to resolving the reference into a machine pointer and accessing the memory at an address indicated by the machine pointer. When the run-time external reference is dereferenced during operation of the run-time environment, the memory for the external object referenced by the run-time external reference may be allocated and initialized, frequently in non-session memory (step 304). The external reference is often to shared memory, for example, to a shared part of a Java class.

Figure 6:
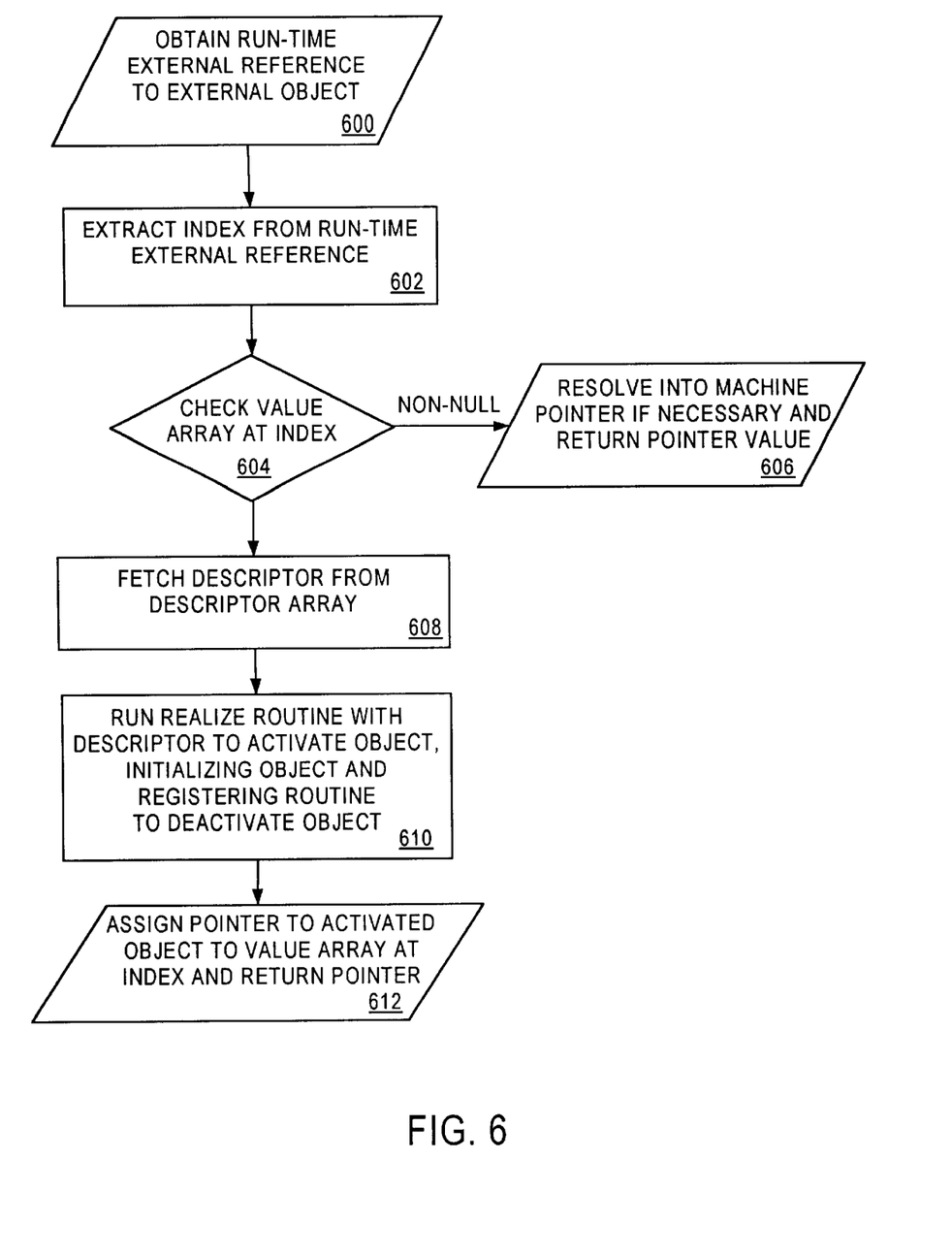
FIG. 6 is flowchart for dereferencing an external reference in an embodiment of the present invention.

FIG. 6 is a flowchart illustrating steps taken in resolving a run-time external reference into a machine pointer to a loaded, external reference. At step 600, a run-time external reference is obtained, typically by reading the run-time external reference from a slot in an object at a given memory address. Assuming the tag value of the reference indicates that the reference is indeed a run-time external reference, the index portion 406 of the run-time external reference 400 is extracted (step 602).

At step 604, the value array, e.g. value array 243 for client process 252, is checked at the extracted index. The value array 243 stores references to previously loaded external objects. If an external object is not loaded, then the corresponding reference in the value array 243 is null. Therefore, if the reference in the value array 243 is not null, then the external object referenced by the run-time external reference is currently loaded. Thus, the reference in the value array 243, if not already a machine pointer, is resolved into a machine pointer value and returned (step 606).

If, on the other hand, a null reference was found in the value array 243, then the external object needs to be activated. Accordingly, the descriptor for the external object is fetched from the same index in the parallel descriptor array 232 (step 608). The descriptor array 232 entry for this index was previously set when the run-time external reference was originally assigned. The realize routine, associated with the stub object, such as a member function or a generic function, is executed, using the fetched descriptor value (step 610).

Running the realize routine causes memory for the object to be initialized and registers the end-of-call routine to deactivate the object. The implementation of the realize routine will vary from object to object, but the present invention is not limited to any particular implementation of the realize routine. After the realize routine is run, the pointer to the activated object is cached in the value array at the index and returned (step 612).

Therefore, a mechanism has been described in which an end-of-call routine is registered to deactivate an object so that the object is not migrated into session memory. The primary advantage of this mechanism is that a simple way has been provided for users to reduce the session memory footprint. Applying this technique to a handful of JAVA™ programming language system classes, especially the stream classes, has reduced the session memory footprint for a "Hello, World!" program from over 170Kb to under 50Kb, which enables at least three times as many users to have concurrent sessions.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of managing memory in a run-time environment, comprising the steps of:
   activating an object, wherein said activating includes the steps of:
   initializing the object; and
   registering a routine to deactivate the object at an end of a call; and
   executing the routine to deactivate the object at the end of the call.

2. The method according to claim 1, further comprising the step of:
   garbage collecting the object at the end of the call,
   wherein the executing of the routine to deactivate the object is performed after finalizing non-live objects during the garbage collecting.

3. A method of managing memory in a run-time environment, comprising the steps of:
   accessing an object by means of an external reference, wherein said accessing includes the steps of:
   extracting an index from the external reference;
   fetching a pointer value from an entry in a value array at a position indicated by the index;
   if the pointer value is a null value, then performing the steps of:
   fetching a descriptor from an entry in a descriptor array at a position indicated by the index;
   initializing the object based on the descriptor; and
   registering a routine to deactivate the object at an end of a call; and
   executing the routine to deactivate the object at the end of the call.

4. The method according to claim 3, wherein: the executing of the routine to deactivate the object includes setting the object to null.

5. The method according to claim 4, further comprising the step of:
   garbage collecting the object at the end of the call,
   wherein the executing of the routine to deactivate the object is performed after finalizing non-live objects during the garbage collecting.

6. A computer-readable medium bearing instructions for managing memory in a run-time environment, said instructions being arranged to cause one or more processors upon execution thereby to perform the steps of:
   activating an object, wherein said activating includes the steps of:
   initializing the object; and
   registering a routine to deactivate the object at an end of a call; and
   executing the routine to deactivate the object at the end of the call.

7. The computer-readable medium according to claim 6, further comprising the step of:
   garbage collecting the object at the end of the call,
   wherein the executing of the routine to deactivate the object is performed after finalizing non-live objects during the garbage collecting.

8. A computer-readable medium bearing instructions for managing memory in a run-time environment, said instructions being arranged to cause one or more processors upon execution thereby to perform the steps of:

accessing an object by means of an external reference, wherein said accessing includes the steps of:

extracting an index from the external reference;

fetching a pointer value from an entry in a value array at a position indicated by the index;

if the pointer value is a null value, then performing the steps of:

fetching a descriptor from an entry in a descriptor array at a position indicated by the index;

initializing the object based on the descriptor; and         registering a routine to deactivate the object at an end of a call; and     executing the routine to deactivate the object at the end of the call.

9. The computer-readable medium according to claim 8, wherein: the executing of the routine to deactivate the object includes setting the object to null.

10. The computer-readable medium according to claim 8, further comprising the step of:

garbage collecting the object at the end of the call, wherein the executing of the routine to deactivate the object is performed after finalizing non-live objects during the garbage collecting.

* * * * *

UNITED STATES PATENT AND TRADEMARK OFFICE
CERTIFICATE OF CORRECTION

PATENT NO. : 6,604,182 B1 Page 1 of 1
DATED : August 5, 2003
INVENTOR(S) : Harlan Sexton et al.

It is certified that error appears in the above-identified patent and that said Letters Patent is hereby corrected as shown below:

<u>Column 1,</u>
Line 30, delete "60/185,135" and insert -- 60/185,134 --.

Signed and Sealed this

Fourth Day of April, 2006

JON W. DUDAS
*Director of the United States Patent and Trademark Office*